United States Patent
Thieret

(10) Patent No.: US 6,873,432 B1
(45) Date of Patent: Mar. 29, 2005

(54) METHOD AND APPARATUS FOR REPRESENTING COLOR SPACE TRANSFORMATIONS WITH A PIECEWISE HOMEOMORPHISM

(75) Inventor: Tracy E. Thieret, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/451,409

(22) Filed: Nov. 30, 1999

(51) Int. Cl.[7] ............................................. G06F 15/00
(52) U.S. Cl. ...................... 358/1.9; 358/518; 382/162
(58) Field of Search ........................ 358/1.9, 518, 519, 358/520, 162, 166, 167; 345/419, 423, 427, 501, 604

(56) References Cited

U.S. PATENT DOCUMENTS

| | | | |
|---|---|---|---|
| 2,790,844 A | | 4/1957 | Neugebauer |
| 3,870,968 A | | 3/1975 | Vosteen et al. |
| 4,205,257 A | | 5/1980 | Oguro et al. |
| 4,275,413 A | | 6/1981 | Sakamoto et al. |
| 4,403,866 A | | 9/1983 | Falcoff et al. |
| 4,500,919 A | | 2/1985 | Schreiber |
| 4,724,461 A | | 2/1988 | Rushing |
| 4,731,860 A | * | 3/1988 | Wahl .......................... 382/281 |
| 4,853,639 A | | 8/1989 | Vosteen et al. |
| 4,887,217 A | | 12/1989 | Sherman et al. |
| 5,003,327 A | | 3/1991 | Theodoulou et al. |
| 5,045,882 A | | 9/1991 | Roehrs et al. |
| 5,103,429 A | * | 4/1992 | Gelchinsky .................. 367/38 |
| 5,107,332 A | | 4/1992 | Chan |
| 5,185,661 A | * | 2/1993 | Ng .............................. 358/505 |
| 5,243,383 A | | 9/1993 | Parisi |
| 5,416,613 A | | 5/1995 | Rolleston et al. |
| 5,471,313 A | | 11/1995 | Thieret et al. |
| 5,471,324 A | | 11/1995 | Rolleston |
| 5,481,380 A | | 1/1996 | Bestmann |

(Continued)

FOREIGN PATENT DOCUMENTS

| | | | | |
|---|---|---|---|---|
| EP | 0 398 502 B1 | | 6/1996 | |
| EP | 0 741 491 A2 | | 11/1996 | |
| EP | 0 747 853 A2 | | 12/1996 | |
| EP | 0 814 400 A2 | | 12/1997 | |
| EP | 0814400 A2 | * | 12/1997 | ............ G06F/3/12 |
| EP | 0 854 638 A2 | | 7/1998 | |
| EP | 0 891 078 A | | 1/1999 | |
| JP | 4-314768 | | 11/1992 | |
| WO | WO 95/33331 | * | 12/1995 | ............ H04N/1/60 |
| WO | WO 96 41309 A | | 12/1996 | |

OTHER PUBLICATIONS

U.S. Appl. No. 08/786,010, filed Jan. 21, 1997.
U.S. Appl. No. 09/083,202, filed May 22, 1998.
U.S. Appl. No. 09/083,203, filed May 22, 1998.
U.S. Appl. No. 09/221,996, filed Dec. 29, 1998.

(Continued)

*Primary Examiner*—Mark Wallerson
(74) *Attorney, Agent, or Firm*—Fay, Sharpe, Fagan, Minnich & McKee, LLP

(57) ABSTRACT

A color printing/display system includes a representation for approximating color space transformation comprising a set of piecewise homeomorphisms for enhancing accuracy of parametric models associated with the homeomorphisms. The homeomorphisms and parametric models are selectively adjustable in accordance with printer/display calibrating data. Preferably the piecewise sub-spaces comprise corresponding simplices with domain and co-domain color spaces. The simplices are adjusted by calculating new locations for the vertices having a consequence of converging parametric model performance in accordance with the predetermined objective of the system.

15 Claims, 3 Drawing Sheets

U.S. PATENT DOCUMENTS

| | | | |
|---|---|---|---|
| 5,483,360 A | | 1/1996 | Rolleston et al. |
| 5,491,568 A | | 2/1996 | Wan |
| 5,508,826 A | | 4/1996 | Lloyd et al. |
| 5,528,386 A | | 6/1996 | Rolleston et al. |
| 5,539,522 A | | 7/1996 | Yoshida |
| 5,544,258 A | | 8/1996 | Levien |
| 5,559,173 A | | 9/1996 | Campo et al. |
| 5,581,376 A | | 12/1996 | Harrington |
| 5,594,557 A | | 1/1997 | Rolleston et al. |
| 5,612,902 A | | 3/1997 | Stokes |
| 5,659,406 A | * | 8/1997 | Imao et al. ............... 358/518 |
| 5,662,044 A | | 9/1997 | Löffler et al. |
| 5,664,072 A | | 9/1997 | Ueda et al. |
| 5,671,059 A | | 9/1997 | Vincent |
| 5,708,916 A | | 1/1998 | Mestha |
| 5,717,978 A | | 2/1998 | Mestha |
| 5,734,407 A | | 3/1998 | Yamada et al. |
| 5,734,745 A | * | 3/1998 | Ohneda ..................... 382/167 |
| 5,734,802 A | | 3/1998 | Maltz et al. |
| 5,739,927 A | | 4/1998 | Balasubramanian et al. |
| 5,748,221 A | | 5/1998 | Castelli et al. |
| 5,749,019 A | | 5/1998 | Mestha |
| 5,749,021 A | | 5/1998 | Mestha et al. |
| 5,754,918 A | | 5/1998 | Mestha et al. |
| 5,760,913 A | * | 6/1998 | Falk ........................... 358/298 |
| 5,798,764 A | * | 8/1998 | Akiyama .................... 345/423 |
| 5,809,213 A | | 9/1998 | Bhattacharjya |
| 5,812,903 A | | 9/1998 | Yamada et al. |
| 5,822,079 A | | 10/1998 | Okuno et al. |
| 5,828,781 A | * | 10/1998 | Nakano ...................... 382/167 |
| 5,852,443 A | * | 12/1998 | Kenworthy ................. 345/441 |
| 5,884,118 A | | 3/1999 | Mestha et al. |
| 5,923,770 A | * | 7/1999 | O'Donnell et al. ......... 382/131 |
| 5,963,244 A | | 10/1999 | Mestha et al. |
| 5,969,725 A | * | 10/1999 | Fujiki et al. ................ 345/619 |
| 6,133,921 A | * | 10/2000 | Turkiyyah et al. .......... 345/420 |
| 6,204,939 B1 | * | 3/2001 | Lin et al. .................... 358/518 |
| 6,208,353 B1 | | 3/2001 | Ayer et al. .................. 345/435 |
| 6,269,184 B1 | * | 7/2001 | Spaulding et al. .......... 382/167 |
| 6,342,951 B1 | * | 1/2002 | Eschbach et al. ........... 358/1.9 |
| 6,373,489 B1 | * | 4/2002 | Lu et al. ..................... 345/428 |
| 6,400,843 B1 | * | 6/2002 | Shu et al. .................... 382/167 |
| 6,404,511 B1 | * | 6/2002 | Lin et al. .................... 358/1.9 |
| 6,421,142 B1 | * | 7/2002 | Lin et al. .................... 358/1.9 |

OTHER PUBLICATIONS

U.S. Appl. No. 09/232,465, filed Jan. 19, 1999.

U.S. Appl. No. 09/455,761, filed Dec. 7, 1999.

Olga Yaritza Ramirez, "Online System Identification Using an Adaptive Algorithm to Control Color Drift in a Marking Device", (Graduate Paper submitted in partial fulfillment of degree requirements, Sep. 1999, Rochester Institute of Technology, Rochester NY.

Po–Chieng Hung, "Tetrahedral Division Technique Applied to Colorimetric Calibration for Imaging Media", Annual meeting IS&T, NJ May, 1992, p. 419–422.

Po–Chieng Hung, "Colorimetric Calibration for Scanners and Media", SPIE, vol. 1448, Camera and Input Scanner System, (1991).

Sigfredi I. Nin et al., "Printing CIELAB Images on a CMYK Printer Using Tri–Linear Interpolation", SPIE Proceedings, vol. 1670, 1992, p. 316–324.

Henry Kang, "Color Technology for Imaging Devices", pp. 318–327.

Ocean Optics, Inc., "Miniature Lights for Miniature Spectrometers".

Chang, James Z. et al., "Sequential Linear Interpolation of Multidimensional Functions", IEEE Transactions on Image Processing, vol. 6, No. 9, Sep. 1997.

Groff, Richard, Khargonekar, P., Koditschek, D., Thieret, T., Mestha, LK, "Modeling and Control of Color Xerographic Processes", Paper to be presented at the CDC99 meeting in Phoenix, Arizona, Dec. 7–10, 1999.

* cited by examiner

METHOD AND APPARATUS FOR REPRESENTING COLOR SPACE TRANSFORMATIONS WITH A PIECEWISE HOMEOMORPHISM

FIELD OF THE INVENTION

The subject invention pertains to the art of color management and image/text printing or display systems, and is especially applicable to a method and apparatus for accurately representing color space transformations between input and output gamuts of a color reproducing device with invertable functional models. More particularly, the invention relates to algorithmically approximating the color space transformation with a set of parametric models each associated with a piecewise homeomorphism (PH) wherein the model may be readily inverted and sampled to yield a desired color rendition dictionary (CRD) for the device operation.

Color correction and/or control should not be confused with color registration systems and sensors for insuring that colors are positioned properly, printed accurately, superposed correctly and/or adjacent to one another.

BACKGROUND OF THE INVENTION

Color perception is a psychological and physiological phenomenon that involves three elements: light, object and observer. Color changes as light, medium (i.e., paper, monitor) and observer interact. Color may be perceived differently under different types of lighting. Light sources that affect color include incandescent and fluorescent light. The first makes color seem more red and orange while the second emphasizes green and yellow tones. Different types of media also affect color perception. Observers view images on paper using reflection. In other cases the medium can be transmissive or emissive. Transparencies are an example of a transmissive medium while a computer monitor is emissive. The third element in the phenomenon is the observer. Different people may see the same color slightly differently. In order to characterize color image quality, the interaction of these elements must be understood so that when colors are intended to be matched, i.e., monitor to printer, scanner to printer, etc., acceptable appearance results.

For automatic control systems spectral data is often used to represent color perception as a pattern of wavelengths that leave the object before being interpreted by a viewer. Spectral data defines color independent of observer influence. Spectrophotometers and calorimeters are sensing devices used to measure spectral data.

There are different ways of representing color. One way color is described consists of the following parameters: hue, lightness and saturation. Hue represents the actual color wavelength (red, blue, etc.), lightness corresponds to the white content while saturation captures the richness or amplitude in color. Another way of describing color uses the three dominant primary colors red, blue and green (RGB). By combining these primary colors, in different intensities, most colors visible to humans can be reproduced. Monitors and scanners use the additive RGB color process. Printers use the subtractive CMYK (cyan, magenta, yellow and black) color process based on light reflected from inks coated on a substrate. To the extent that the color representations described above fail to reproduce color predictably, it is because they are observer or device dependent.

In today's business and scientific world, color has become essential as a component of communication. Color facilitates the sharing of knowledge and ideas. Companies involved in the development of digital color print engines are continuously looking for ways to improve the accuracy and total image quality of their products. One of the elements that affects image quality is the ability to consistently produce the same quality image output on a printer from one day to another, from one week to the next, month after month. Colors on a printer tend to drift over time. The variations arise from changes in the properties of the marking process (toner tribo, photoreceptor charge, transfer variations, temperature, humidity, and other marking and environmental factors). Maintaining an accurate printer operation requires regular recalibration, usually a time consuming, and accordingly undesirable task of sampling large numbers of test patches which are additionally interpolated to construct the CRD describing the printer transforming process. As electronic marketing has placed more importance on the accurate representation of merchandise in illustrative print or display media, consistent and accurate printer operation becomes more important, and regular recalibrating becomes more necessary.

Customers will usually specify their color demands in a device independent color space as part of a page description language (PDL). L*, a*, b* are the independent space representations of the CIE (Commission Internationale de L'éclairage) for color standards utilized in the functional modeling of these color demands. L* defines lightness, a* corresponds to the red/green value and b* denotes the amount of yellow/blue. Accurate transformation between L*, a*, b* representations and CMYK representations and vise versa are the principal applications of the subject invention.

When customers specify colors in device independent color coordinates, it is incumbent upon the printing/display device to determine which combination of available colorants (typically cyan, magenta, yellow and black) will yield the colors specified by the customer. This determination is frequently embodied in a look-up table (LUT) called the color rendition dictionary (CRD). Calculation of the CRD involves making patches in the printer's input space and examining the output thus yielding the forward transfer function which is then inverted to give the recipes for making the colors available in the printer's gamut.

These recipes are typically formulated using a large number of sampled data patches that are then interpolated to describe the transformation between the input and output spaces of the printing device. Because of the nature of the printer, these recipes are non-linear, time varying functions and thus are prone to inaccuracies if not updated at least occasionally. The updating process is tedious for customers and service representatives and is thus performed infrequently. If the process could be streamlined, it might be performed more frequently leading to improved color accuracy. With proper color calibration, customers could specify colors at document creation time and have an increased assurance that the printed colors would "match" (i.e. appear similar to) the desired colors.

The input space (domain) describes all the possible ways of mixing the three printer colorants (for example, cyan, magenta, and yellow but many other triplets are possible.) Typically the halftone density of a colorant is specified by an 8 bit integer (a whole number between 0 and 255). For the 3-space of inputs, the domain of the transformation consists of a three dimensional cube, 255 units on a side with one corner at the origin. The co-domain space of the transformation is the color gamut of the printer, the three dimensional volume that indicates all the L*, a*, b* values which are accessible by mixing the three colorants. This co-domain volume is of irregular shape and represents a sampled non-linear function of the input space. Since customers specify their desired colors in this space, the problem is to accurately print/display them and therefore derive the reverse transformation by inversion of the functional relationship between the domain and co-domain spaces detailed above.

No accurate functional representation of this transformation exists. The situation is complicated by the fact that the relationship between the digital inputs (domain) and the color outputs (co-domain) of the printer is not fixed for all time. If it were, the calibration could be performed once and always yield correct results. The variations in the appropriate calibration are due to variations in the printer's transfer function. Thus the transformation is at the same time non-linear (it requires a complex representation) and dynamic (varying in time).

On-line model prediction is also known as "system identification" in automatic controls literature. It is the terminology used for the process of characterizing a given system under control. Characterization of the system can be done in two ways; non-parametric and parametric. In non-parametric system identification, the profile of the device can be measured by printing specific target colors as specified by the ICC standards. This profile is used as it is (without constructing any model of the device) while making rendering decisions/viewing of the customer colors on the monitor. This is a one time measurement and does not use the historical information to construct any model. Whereas in the parametric system identification, target colors can be printed part of the banner sheet/header sheet or else the target colors can be extracted from the customer image and measured either by measuring straight from the output image or by rendering a subset of customer colors as target color patches. The intention in the parametric system identification is to adjust the parameters of the model and refine it over time by using past and present color data so that the model is accurate.

There is a continuing need for improved on-line modeling and convenient calibrating of color printing devices. Current needs are better served with model processing in a way that accurate parameters of a parametric model can be quickly identified through an interactive computation scheme. By "homeomorphism" in the context of this subject invention is meant the properties of the functions that are chosen to describe the transformations between sub-spaces in corresponding domains and co-domains where a particular parametric model defines the transformation from a domain value to a co-domain value. The homeomorphic transformations concerning a color marking device operation comprise the transformation function for data value conversion between the domain and co-domain. The subject invention deals with altering the defining boundary space of each of a set of sub-spaces, so that the parametric models associated with each sub-space are varied to a set which cumulatively most accurately estimates the non-linear printer transforming process, and further can be updated or recalibrated much more easily than could be done in the past.

The subject invention exploits a key enabling factor for these operational advantages by constructing and maintaining a current model of the reproducing device operation (also known as the device profile or characteristic, input-output model of reproducible color). The new and improved method constructs a dynamic model by segregating color spaces into a set of homeomorphisms each having an associated parametric model. When a customer has a need to accurately match the colors displayed or printed on various output devices, such as monitors (CRT, LCD, etc.) and printers (xerographic, ink jet, ionographic, etc.), he/she can recalibrate the existing model with a minimal number of new data patches and avoid having to build an entire new model and corresponding CRD.

BRIEF SUMMARY OF THE INVENTION

In accordance with the present invention, there is provided a method and apparatus for determining an invertable functional approximation of a transformation between color spaces of a color printer. The color spaces are segregated into a plurality of sub-spaces and the transforming of data values between associated sub-spaces is represented by corresponding parametric models. The identification of the best choice for these sub-spaces is determined by first selecting a set of parameters effectively defining the number of these sub-spaces which will comprise the input and output color space domains. In the preferred embodiment in three dimensions the sub-spaces comprise tetrahedra. The transformation of data values between an input sub-space and the corresponding output sub-space is first estimated by computing an invertable functional parametric model of the transforming process based upon a set of predetermined sampled data values. The parametric model then gives estimates of the output values in the co-domain for each given input value in the domain. The performance of the initial set of parametric models is assessed against a preselected objective function, such as minimal error between the predetermined data and the estimate from the parametric model. The assessment will usually indicate that an adjustment of the tetrahedra, i.e., a relocating of boundary points defining the space for each tetrahedra, will facilitate better and more accurate functional parametric models. In other words, the tetrahedra are relatively arranged so that the parametric models associated with each tetrahedron individually are designed to more accurately represent the transformation of a sub-space contained by a tetrahedron. Taken collectively then, the cumulative configuration of tetrahedra describe an improved and more accurate representation of the color transforming process.

In accordance with another aspect of the present invention, the assessing the performance of the estimation comprises minimizing a mean squared error of the approximations, forcing continuity across the tetrahedra or minimizing a maximum approximation error between the approximations and the predetermined transformation data.

In accordance with another aspect of the present invention, the adjusting the parameters for the sub-spaces comprises recomputing different locations for vertices of the tetrahedra within the color space until a predetermined termination condition for the adjusting occurs. Such a termination condition can comprise defining a minimum total step distance for the adjusting, a minimum of the mean squared error for the approximations or maximum number of adjusting steps.

In accordance with the present invention, a color printing/display system is provided which includes a representation for approximating color space transformation comprising a set of piecewise homeomorphisms configured for enhancing an accuracy of parametric models associated with the homeomorphisms, wherein the homeomorphisms and parametric models are selectively adjustable in accordance with printer/display calibrating data. In the preferred embodiment in 3 dimensions the homeomorphisms comprise corresponding tetrahedra having vertices within domain and co-domain color spaces. The tetrahedra are selectively adjustable in configuration by calculating new locations for the vertices. The tetrahedra configurations are adjusted until the parametric models associated with the tetrahedra are cumulatively a more accurate estimation of the printing/display color space transformation process. Recalibration over time can be effected by merely sampling tetrahedra vertices data values—a greatly reduced number than what is required for an operational LUT.

One advantage obtained by use of the present invention is an algorithm and process for estimating a functional representation of the transformation process between color spaces.

Another advantage of the subject invention is that the functional representation is adjustable and can automatically converge to a better estimation in accordance with the predetermined objective criteria for the representation process.

Another advantage of the subject invention is that after the piecewise homeomorphisms are adjusted to an acceptable set, a recalibration of the printing/display device can be affected with a lesser number of sampled test patch data values.

Other benefits and advantages for the subject new methods and systems will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be is described in detail in the specification and illustrated in the accompanying drawings, which form a part hereof and wherein.

DESCRIPTION OF THE PREFERRED EMBODIMENTS

Figure 1:
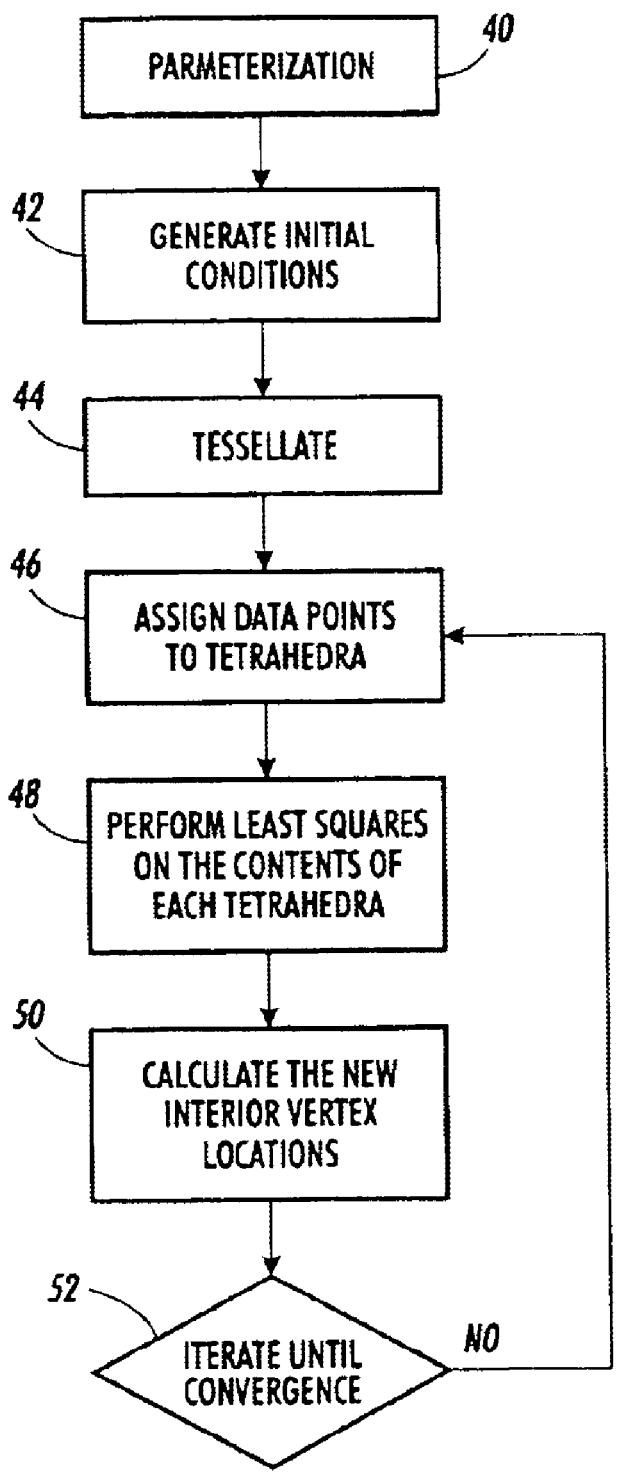
FIG. 1 is a flowchart detailing the processing steps for construction of a parametric model representing a color reproducing device operation wherein the model is comprised of a plurality of piecewise homeomorphisms.

Referring now to the drawings wherein the showings are for purposes of illustrating the preferred embodiments of the invention only and not for the purposes of limiting same, the figures show a method and apparatus for generating a parametric model of a color reproducing device color transforming process comprising a set of piecewise homeomorphisms. The invention has principal and practical applications in a color printing system where a customer is desirous of a readily recalibratable system requiring minimal time for the recalibration process in a convenient manner. Both the model and homeomorphisms are intended to be updated over time for recalibration of the system.

Figure 2A:
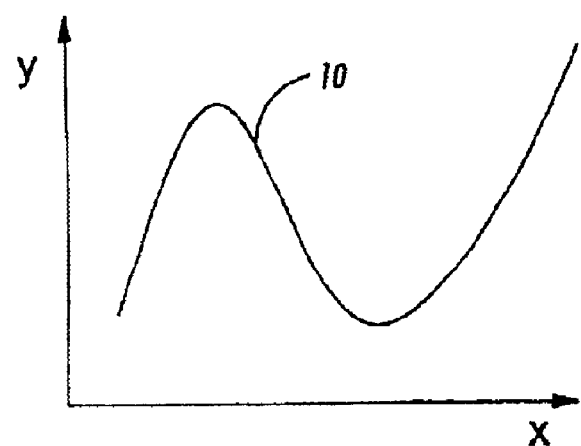
FIGS. 2a–2c are schematic diagrams illustrating simplified operational features of the invention.
Figure 2B:
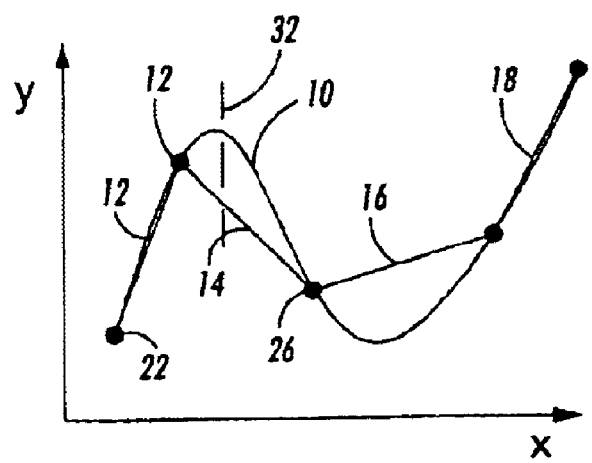
Figure 2C:
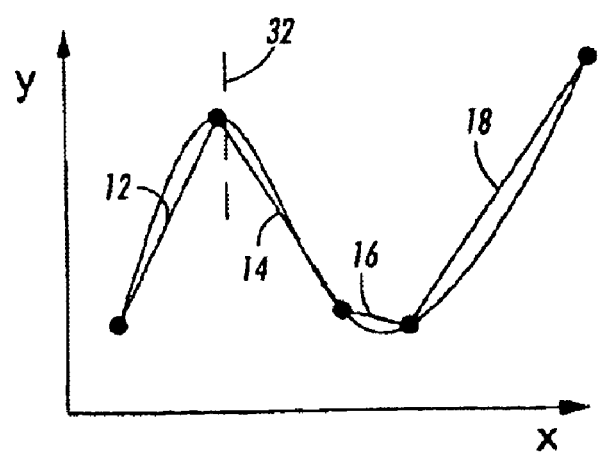

The subject invention deals with complex multi-dimensional mathematical representations of a physical process of converting an input signal defining a desired color into an accurate printing of that color. As noted above, the representation of the process is both complex and dynamic. With reference to FIGS. 2a–2c, a very simplified illustration of some of the important features of the subject invention are illustrated for a better understanding of the actual implementation of the invention for a real printing process representation. Bear in mind that color space transformation is a multi-dimensional process and so is very difficult to illustrate in text. FIG. 2a is intended to illustrate a non-linear function 10 and so has a common characteristic with the color transforming process itself, but, of course, FIG. 2a is merely a one-dimensional representation. In FIG. 2b, the function 10 may be approximated by a set of linear segments 12, 14, 16, 18 each associated with and approximating a portion of the function 10. The number of segments selected is determined by the parameterization chosen and here four lines of equal length were chosen to represent the function. Obviously, the more segments that are selected, the closer the approximation can become, but on the other hand, the difficulty in computing each of the segments relative to the x and y axes correspondingly increases. It is an intention of the invention that the transformation be represented with a minimal number of data points. The more data points that are used the more tedious the process of recalibration. Ideally, parameterization results in a minimal parameter set that describes the function and still satisfies the global objectives. As lines, the segments are mathematically identified by a linear function, e.g., (y=Ax+b) in the x,y coordinate system of the FIG. 2b. In the example of FIG. 2b, four segments are illustrated and in effect, the function 10 is "parameterized" into the four segregatable segments, each of which is a different linear functional approximation of the corresponding adjacent portion of the nonlinear function 10. Another feature of the segments of FIG. 2b is that the segments include at least one end point which is shared with another segment. In other words, segment 12 is defined by end points 22, 24 and segment 14 is defined by end points 24, 26. In the one-dimensional space of FIG. 2b, the location of points 22, 24, 26 can be clearly defined by corresponding x and y coordinates. Another important feature to note in FIG. 2b is that at least for segment 14, there is some substantial inaccuracy where the straight line segment estimating the corresponding portion of the function 10 is substantially spaced from the actual value of the function. Note, for example, that dashed line 32 shows that for the same x coordinate value the function 10 and segment 32 have different y values are different so that at least at that x value, segment 14 is an inaccurate estimation of the actual functional model 10.

In FIG. 2c, the segments, although remaining four in number have been changed into different lengths so that now the position of the end points of each segment in the xy coordinate system has changed. The important point to note is that as a consequence of the change in segment location, the cumulative accuracy of the four segments has improved over the cumulative accuracy of the four segments in FIG. 2b. More importantly, it can be seen that where the nonlinearity of function 10 is acute, i.e., adjacent segment 16, the segment has been shortened to reduce the corresponding inaccuracy and segments 12 and 14 have been lengthened. The values of the segment approximation at dashed line 32 is much more accurate in FIG. 2c relative to the actual function 10. The principal of moving the individual segments into different locations that cumulatively more accurately represent the overall function 10 is the underlying principal of the subject invention that is applied to a much more complex multi-dimensional nonlinear functional process. The nonlinear function 10 is intended to represent the nonlinear transforming process of an input signal to an output signal through a color printer. The segments 12, 14, 16, 13 represent piecewise linear homeomorphisms approximating the function 10 and in FIG. 2c, those segments or sub-spaces have been re-configured from the initial approximation of FIG. 2b so that the cumulative set more accurately represents the overall function 10 or each corresponding segment of the function 10.

Figure 3:
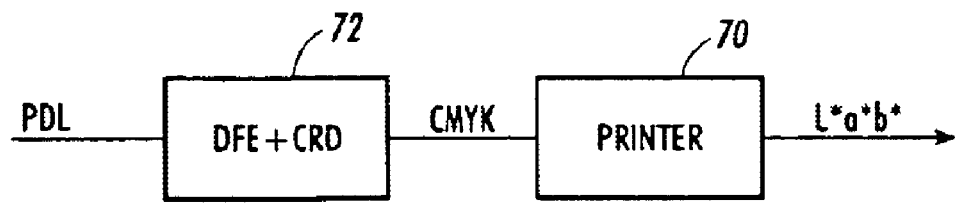
FIG. 3 is a schematic/block diagram of a printing/display system embodying the invention.

With reference to FIGS. 1 and 3, the subject invention describes a method and apparatus for estimating a color space transforming process in a dynamically varying color reproducing device such as printer 70. The invention is applicable to other display devices besides printers. The subject invention algorithmically approximates the complex, nonlinear, multi-dimensional transformation of such a device with a PH while using a minimal number of predetermined sample test values of the actual transformation process. A particular advantage of the PH description is that it may be readily inverted and sampled to yield a desired LUT and corresponding CRD 72. A parameterization 40 determines the degree or number of analytical, parametric models that are utilized for the functional approximation of the color processing transformation. Parameterization comprises choosing how many points the user wishes to use in the approximation of the function. Such a choice will determine the degree of accuracy possible. More points will yield improved accuracy. In the preferred embodiment for the three dimensional case the input domain (CMY) 74 to the printer 70 is cubic by definition. The cube is, of course, defined by eight corner points. In parameterizing or segmenting the cube, tetrahedra are preferably employed, as opposed to another cube, because each tetrahedron can be defined with only four points as opposed to eight. The computational requirements for handling tetrahedra morphing as opposed to other volumes are accordingly lessened by the lesser number of defining points. However, the subject invention is applicable beyond three dimensions to other arbitrary invertable functions represented as individual simplices.

Corresponding tetrahedra must also be assigned to the co-domain space. For the cubic input domain of CMY space the eight points assigned to the co-domain cube will also be vertices of the tetrahedra partitions that fill the domain space. The domain space is either completely filled or enclosed by the tetrahedral sub-spaces. The remainder of the chosen points will also be vertices that will be assigned to the interior or some end wall of the cube. The parameterization step essentially determines how many vertices are chosen to represent the input domain. It must also be kept in mind though, that the corresponding tetrahedra in the co-domain or output space (L*, a*, b*) which is, as noted above, not normally cubic, will enclose the co-domain. More importantly, the transforming of data values from the input domain to the output co-domain is nonlinear so that any linear, invertable approximation will not be completely accurate. However, it is a feature of the invention that each set of corresponding tetrahedra will have a parametric linear or non-linear model that will define a transformation process.

After the degree of parameterization is chosen, an initial definition of the coordinate positions of the interior vertices is generated 42. As will be later appreciated, the actual initial conditions will not be optimal and the convergence process is designed to effect the best available representation using the given parameterization. Accordingly, the generation step merely requires some definition of coordinates in the domain and co-domain for the tetrahedral vertices within the corners of the domain cube.

Tessellation 44 comprises defining the domain and co-domain volumes into a plurality of tetrahedra with a standard tessellation protocol program. Such a known program is a Delaunay tessellation, but of course other choices are possible. The objective of tessellation is to take the vertices defined by the parameterization step and connect them into tetrahedra so that the sub-spaces are defined. Ideally, the tessellation program not only deals with uniform tessellation of the domain and co-domain spaces but also may acknowledge a nonuniform distribution of data within the domain and co-domain spaces. The tessellation in the domain is the same as the tessellation in the co-domain in that the domain tessellation is translated to the co-domain tessellation. The tessellation must fill or enclose the domain space leaving no region uncounted.

Assigning 46 data points to the tetrahedra comprises assigning predetermined transformation data obtained from a large number of sampled test patches to corresponding domain and co-domain tetrahedra. The transformation data is acquired by specifying many input values, printing the values as color patches and reading the corresponding output value coordinates of the output color in the co-domain space. Such acquisition of sample data is similar to prior art calibration methods used for building an LUT and a conventional CRD. The data values are then assigned to the tetrahedra by determining which tetrahedron encloses the data point in the domain and co-domain. Known computational geometric techniques are available for determination of which points are in which tetrahedral volumes.

The transformation process of a set of data values within a domain tetrahedron to corresponding output data values in the co-domain space is approximated with a functional parametric model, for example for a linear approximant, mathematically represented by $$y = Ax + b \tag{1}$$

where y represents the co-domain data value, x represents the domain value, A is the conversion matrix and b is the compensating offset value. Such a linear approximation will of course have some inaccurate representations of the transforming process, just as the individual segments illustrated in FIG. 2b had some disparate values with the actual function model 10. However, the parametric model is determined in accordance with a conventional mathematical computation evaluation for minimizing the error by performing 48 a least squares analysis on the contents of each tetrahedron. Such least squares computation comprises a calculation of an N dimensional least squares (in the specific embodiment discussed here N=3) for each tetrahedron yielding the least squares parameters for the matrix A and the vector b. The error in the approximation is calculated by comparing the Ax+b value to the actual transformation data value. After the parameters have been determined in accordance with the least squares analysis, the various corresponding tetrahedra, each having a respectively assigned parametric model comprise cumulatively a piecewise homeomorphism (PH) representing the transforming process of input data values to output data values. In addition, the parametric model comprising part of the homeomorphism is a functional, invertable model which can be used to adjust a customer requested color as defined in device independent space (L*, a*, b*) to the appropriate device dependent CMY input signal so that the printer can output the customer desired color (L*, a*, b*). The requirement of invertability of the parametric model is important to note here for the ease in mathematically and analytically adjusting values without having to build and use an LUT constructed of thousands of sample patches. An input signal is converted to an adjusted input signal CMY' that will provide the appropriate output signal L*, a*, b* depending upon the individual, device dependent transformation process of a particular printer.

An objective function must be assigned to the performance of the cumulative set of functional models. For example, if the objective were that the functional models are exactly accurate with the predetermined transformation data, i.e., no error, then an objective function would measure the error between the models and the actual data. The least squares analysis above is such an objective function for error minimization. Other objectives could be chosen such as forcing continuity across the tetrahedra or minimizing the maximum approximation error. Of course other objectives are also possible. In any event, the error or discrepancy between the performance of the parametric model, and the actual test data value can be used as an important criterion for determining if the PHs should be altered for purposes of achieving a new and more accurate PH better satisfying the selected objective for the system. More particularly, for the subject embodiment, new vertex locations can be calculated 50 for the corresponding tetrahedra. Each vertex serves as a corner of some number of tetrahedra. Moving the vertex to a new location may better achieve the objective. One way to effect such moving is by calculating the average A matrix parameters and b vector parameters over the tetrahedra in which the vertex participates. These values are then used to determine a new value of the vertex position that will accordingly change the parametric model for that particular domain and co-domain tetrahedron set. This particular calculation scheme for adjusting vertex locations is particularly useful because using the average A and b values encourages continuity across the piecewise linear volumes, an important factor in color rendition. The other predetermined objects, noted above, could also be used individually or in combination for selectively moving the vertex points. The new vertex location effects a changing of the tetrahedron, and consequent redefinition of the parametric model based upon the change in data values within the tetrahedral volume. The new models which when compared against the objective function, will determine if yet another iteration 52 of the subject algorithm, and consequent adjusting of the tetrahedral sets, is appropriate until convergence is achieved wherein the cumulative set of parametric models best satisfy the objective in approximating the device transformation process. In other words, the algorithm will iterate 52 until some predetermined set of convergence criteria is met. Such criteria may include a minimum total step distance covered by all the interior grid points, a mean squared error for the approximation or a maximum number of iterations. In addition, the motion of the vertices may have resulted in a mesh tangle. In this case, the iteration also requires retessellation to resolve the mesh tangle but, of course, alternatively, a retessellation may occur in each iteration anyway.

The result of this algorithm is a piecewise representation of the transformation that minimizes some objective function—the one used to determine vertex motion in step 50. With this function in hand an assessment of the precision of the approximation may be made by examination of the errors between the approximation and the data values taken during the initial data collection. If the approximation meets the application's requirements, the sequence terminates. If not, additional parameterization is performed and the sequence begun again but omitting the data collection exercise.

The subject representation of the transformation process with a PH is particularly useful for recalibrating of device operation with minimal supplemental test data values. After initial thorough calibration of such a device, adjustments to compensate for the time variation of a printer may be characterized using less than 100 readings (typically 50 or less). The invention proposes an algorithmic method for choosing these points and also a means to determine how many are necessary to achieve a desired accuracy. For example, one could recalibrate with only the newly positioned tetrahedral vertices.

The typical full calibration exercise is performed by printing 1000 or more test patches using known values of the domain coordinates. The prior art describes printer calibration methods using many data points. When a recalibration is required because of the time varying nature of the printing process, this tedious procedure must be performed again and frequently the tedious procedure is omitted with the consequent errors in the color printing process. This greatly reduced parameterization method reduces the recalibration procedure to specifying a small number (less than 50) domain coordinate values to be printed and read. Once this greatly reduced effort is completed, the interpolation process proceeds to use the transformations obtained using the techniques of the present invention to calculate the recipes for forming all the colors that may be requested with more accuracy than what would have occurred if the recalibration had not been performed. The resulting improvement in color printing accuracy is insured by the simplicity of the recalibration process.

This method has been shown to converge for many actual test cases. Test data cases where the "calibration" data are in fact piecewise linear with known parameters have been tried to exercise the algorithm. Small and large nonlinearities have been tested. Both single and multiple interior vertices have been tried. Multiple, widely spaced initial conditions converge to the same point. Noise in the data (up to is accurately dealt with and the algorithm still achieves the same terminal values—equal within round-off error to the known correct ones. Even when the tessellation for the approximant is different from that under which the data were generated, the algorithm converges to the neighborhood of the correct answer. Current work includes cases of continuous functions and multiple interior vertices. Color calibration data have likewise been tried with success.

The invention has been described with reference to the preferred embodiments. Obviously, modifications and alterations will occur to others upon the reading and understanding of the specification. It is my intention to include all such modifications and alterations in so far as they come within the scope of the appended claims or the equivalents thereof.

Having thus described my invention, I now claim:

1. A method of representing a transformation from a domain to a co-domain for a color reproducing device by constructing a piecewise set of invertable, functional approximations of the transformation, comprising steps of:

parameterizing the approximations;

generating an initial set of parameters for the approximations;

tessellating the domain and co-domain in accordance with the parameters for partitioning the domain and co-domain into corresponding sets of domain pieces and co-domain pieces;

assigning predetermined transformation data to the corresponding sets of domain pieces and co-domain pieces and computing respective, functional approximations comprising an invertable parametric model for the transformation data for each of the corresponding sets;

evaluating an accuracy of the respective approximations against a preselected objective representative of a desired accuracy of the transformation;

adjusting selected ones of the parameters for moving the evaluated accuracy to the desired accuracy; and, selectively iterating said steps in accordance with the adjusted selected ones of the parameters until the evaluating satisfies a termination condition relative to the objective wherein the evaluated accuracy at least approximates the desired accuracy whereby the respective approximations cumulatively represent the transformation.

2. The method as defined in claim 1 wherein the domain and co-domain comprise multi-dimensional gamuts for an input signal and an output signal for the reproducing device, respectively, and the tessellating comprises utilizing the initial set of parameters as tetrahedral vertices for the partitioning of the domain and co-domain into corresponding sets of tetrahedra.

3. The method as defined in claim 2 wherein the evaluating comprises assessing an attribute of the functional approximations against the predetermined transformation data.

4. The method as defined in claim 3 wherein the assessing comprises calculating least squares parameters for the approximations and comparing an output of the approximation with actual data values from the predetermined transformation data.

5. The method as defined in claim 2 wherein the objective comprises at least one of minimizing a mean squared error of the approximations, forcing continuity across the tetrahedra, and minimizing a maximum approximation error between the approximations and the predetermined transformation data.

6. The method as defined in claim 2 wherein the adjusting comprises calculating different locations for vertices of the tetrahedra.

7. The method as defined in claim 6 wherein the calculating comprises utilizing an averaging of functional parameters of the approximations for each one of the tetrahedra in which each one of the vertices participates.

8. The method as defined in claim 2 wherein the selectively iterating comprises the termination condition including at least one of a minimizing total step distance of the adjusting, a minimizing of the mean squared error for the approximations and maximizing a number for iterating steps.

9. The method as defined in claim 2 including re-tessellating the domain and the co-domain if the adjusting results in a mesh tangle of the tetrahedra.

10. A method of determining a functional approximation of a transformation between color spaces of a desired color and a color printer wherein the color spaces are segregated into a plurality of sub-spaces and the transforming of data values between associated ones of the sub-spaces is represented by corresponding invertable parametric models, comprising the steps of:

selecting a set of parameters for determining the sub-spaces;

computing the corresponding invertable parametric model for each of the determined sub-spaces based upon predetermined sample data values;

assessing a performance of the parametric model against a preselected objective of the determining of the functional approximation; and, adjusting the parameters for altering a mathematical representation of the sub-spaces and recomputing the parametric models until the assessing satisfies the preselected objective, whereby the corresponding parametric models cumulatively comprise the functional approximation.

11. The method as defined in claim 10 wherein the sub-spaces comprise simplices defined by locations of corner and internal vertices within the color spaces and the adjusting includes calculating a new location of a vertex of the simplex for the adjustment of the simplex.

12. The method as defined in claim 11 wherein the assessing comprises the preselected objective including minimizing a mean squared error of the parametric models and the sample data values, forcing continuity across the tetrahedra, or minimizing a maximum approximation error.

13. The method as defined in claim 12 wherein the adjusting comprises a converging of the adjustment of the tetrahedra and the preselected objective further includes convergence criteria including a minimum total step distance covered by the adjusting of locations of vertices, or a maximum number of iterations of the adjusting.

14. A color printing/display system including a representation for approximating color space transformation comprising a set of piecewise sub-spaces including invertable parametric models for enhancing an accuracy of the parametric models associated with the piecewise sub-spaces, wherein the piecewise sub-spaces and parametric models are selectively adjustable in accordance with printer/display calibrating data; and, wherein the sub-spaces comprise corresponding simplices having corner and interior vertices within domain and co-domain color spaces, the simplices being selectively adjustable by calculating new locations for the vertices.

15. The color printing/display system as claimed in claim 14 wherein the parametric models comprise an invertable function for each of the corresponding simplices describing a transforming of a signal from the domain to the co-domain color spaces, a set of the invertable functions cumulatively comprising the representation for approximating color space transformation.

* * * * *